(12) United States Patent
Abebe et al.

(10) Patent No.: US 10,318,248 B2
(45) Date of Patent: Jun. 11, 2019

(54) CONTEXTUALIZED SOFTWARE COMPONENT SELECTION AND REPOSITORY GENERATION

(71) Applicant: International Business Machines Corporation, Armonk, NY (US)

(72) Inventors: Ermyas Abebe, Altona (AU); Alessio Bonti, Carlton (AU); Andrew L. Frenkiel, Irvington, NY (US); Brendan P. Haesler, Melbourne (AU); Dileban Karunamoorthy, Carlton (AU); Cristian Vecchiola, Southbank (AU)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 15/190,829

(22) Filed: Jun. 23, 2016

(65) Prior Publication Data

US 2017/0371626 A1  Dec. 28, 2017

(51) Int. Cl.
*G06F 8/10* (2018.01)
*G06F 8/30* (2018.01)
(Continued)

(52) U.S. Cl.
CPC ............ *G06F 8/30* (2013.01); *G06F 8/10* (2013.01); *G06F 8/36* (2013.01); *G06F 8/71* (2013.01); *G06Q 10/06313* (2013.01)

(58) Field of Classification Search
CPC ..... G06F 8/30; G06F 8/36; G06F 8/10; G06F 8/71; G06Q 10/06313
(Continued)

(56) References Cited

U.S. PATENT DOCUMENTS

| 2003/0192029 A1* | 10/2003 | Hughes | G06F 8/20 717/101 |
| 2008/0077855 A1* | 3/2008 | Lev | G06F 17/30905 715/236 |

(Continued)

OTHER PUBLICATIONS

Abuhassan, I., A.O., et al., "Domain Ontology for Programming Languages", http://www.scienpress.com/Upload/JCM/Vol%202_4_4.pdf, Journal of Computations & Modelling, Dec. 30, 2012, pp. 75-91, vol. 2, No. 4.

(Continued)

*Primary Examiner* — Emerson C Puente
*Assistant Examiner* — Sen Thong Chen
(74) *Attorney, Agent, or Firm* — Scully, Scott, Murphy & Presser, P.C.; Grant Johnson

(57) ABSTRACT

Contextualized selection of components in one aspect may include generating a developer profile associated with a team member, for example, for all team members designated to work on a computer-implemented development project, and generating a component profile associated with a software component, for example, for all software components identified based on received requirement specification associated with the project. Applicability of a software component to the team members may be computed based on developer profiles and a component profile associated with the software component. Based on the applicability, components are selected and may be downloaded to build a team project component repository.

20 Claims, 3 Drawing Sheets

(51) Int. Cl.
　　*G06F 8/36*　　(2018.01)
　　*G06Q 10/06*　　(2012.01)
　　*G06F 8/71*　　(2018.01)
(58) Field of Classification Search
　　USPC .......................................................... 717/101
　　See application file for complete search history.

(56) References Cited

U.S. PATENT DOCUMENTS

| | | | | |
|---|---|---|---|---|
| 2008/0184203 | A1* | 7/2008 | Yan | G06F 9/44589 717/126 |
| 2008/0235155 | A1* | 9/2008 | Thywissen | G06Q 30/0283 705/400 |
| 2010/0153158 | A1* | 6/2010 | Wex | G06Q 10/00 705/7.27 |
| 2010/0269158 | A1* | 10/2010 | Ehler | G06F 17/30867 726/4 |
| 2012/0036492 | A1* | 2/2012 | Armstrong | G06F 8/30 717/100 |
| 2012/0197809 | A1 | 8/2012 | Earl et al. | |
| 2012/0240096 | A1* | 9/2012 | Sass | G06F 8/75 717/101 |
| 2014/0282355 | A1* | 9/2014 | Berry | G06F 8/70 717/101 |
| 2015/0339104 | A1* | 11/2015 | Frenkiel | G06F 8/20 717/113 |
| 2016/0092185 | A1* | 3/2016 | Botti | G06F 8/60 717/103 |

OTHER PUBLICATIONS

Jadhav, A., et al., "Analytic Hierarchy Process (AHP), Weighted Scoring Method (WSM), and Hybrid Knowledge Based System (HKBS) for Software Selection: A Comparative Study", Second International Conference on Emerging Trends in Engineering and Technology, ICETET-09, Dec. 2009, pp. 991-997.

Jadhav, A., et al., "A Hybrid System for Selection of the Software Packages", First International Conference on Emerging Trends in Engineering and Technology, Jul. 2008, pp. 337-342.

Kaur, L., et al., "Software Component Selection techniques—A review", International Journal of Computer Science and information Technologies (IJCSIT), May-Jun. 2014, pp. 3739-3742, vol. 5, Issue 3.

Kontio, J., "OTSO: A Systematic Process for Reusable Software Component Selection", Institute for Advanced Computer Studies and Department of Computer Science, University of Maryland, Dec. 1995, pp. 1-41.

Mileva, Y.M., et al., "Mining Trends of Library Usage", IWPSE-Evol '09, Aug. 2009, 5 pages.

Zhong, H., "MAPO: Mining and Recommending API Usage Patterns", European Conference on Object-Oriented Programming (ECOOP), Jul. 2009, 25 pages.

Wikipedia, "Analytic hierarchy process", https://en.wikipedia.org/wiki/Analytic_hierarchy_process, Last modified Jun. 2, 2016, Printed on Jun. 24, 2016, 8 pages.

* cited by examiner

CONTEXTUALIZED SOFTWARE COMPONENT SELECTION AND REPOSITORY GENERATION

FIELD

The present application relates generally to computers and computer applications, and more particularly to generating a repository of contextualized components.

BACKGROUND

The creation of software often relies on the use of a number of other pre-existing software components such as libraries, tools frameworks, and others. An increasing plethora of options, both open source and commercial, across various technologies and domains, exist to enable developers to leverage a wide range of capabilities within their software. The choice of which software sub-component such frameworks, libraries, tools and others, to use in a software project impacts the productivity of the team, and the overall success of a project. Such choices are thus made carefully taking into account the team's skills, experience levels and project goals in addition to the various properties of the software components. However, this task is often very complex, time consuming and rarely if ever optimal in its outcome. This is may be due to the multitude of software components to compare and choose from, the difficulty of accurately estimating a team's adoption curve towards software components, and the difficulty in assessing, quantifying and factoring into the decision process, information about a team's skills and project constraints. The disparate and unstructured sources of information from which such data are sourced compound the difficulty.

BRIEF SUMMARY

A method and system of generating a contextualized software tool repository may be provided. The method may be performed by at least one hardware processor. The method, in one aspect, may include receiving, via a user interface, requirement specification associated with a computer-implemented development project. The method may also include receiving, via the user interface, a list of team members to work on the computer-implemented development project. The method may further include generating a developer profile associated with each of the team members. The method may also include generating a component profile associated with each of the software components, the software components identified based on the requirement specification. The method may further include, for each of the software components, computing applicability of a software component to the team members based on the developer profile associated with each of the team members and the component profile. The method may also include, based on the applicability, selecting software components for the computer-implemented development project. The method may also include downloading the software components that are selected, for example, onto a storage device. The method may also include building a team project component repository comprising the downloaded software components.

A system of generating a contextualized software tool repository, in one aspect, may include at least one hardware processor. A storage device may be coupled to the hardware processor. The hardware processor may be operable to receive, via a user interface, requirement specification associated with a computer-implemented development project. The hardware processor may be further operable to receive, via the user interface, a list of team members to work on the computer-implemented development project. The hardware processor may be further operable to generate a developer profile associated with each of the team members. The hardware processor may be further operable to generate a component profile associated with each of the software components, the software components identified based on the requirement specification. For each of the software components, the hardware processor may be further operable to compute applicability of a software component to the team members based on the developer profile associated with each of the team members and the component profile. Based on the applicability, the hardware processor may be further operable to select software components for the computer-implemented development project. The hardware processor may be further operable to download the software components that are selected. The hardware processor may be further operable to build a team project component repository comprising on the downloaded software components and store in the storage device.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

System, method, and technique are presented that support software component selection based on contextualized information about teams such as skill level and preferences, and their specific project requirements and constraints.

In one embodiment, the system and method may integrate social components related to the successful execution of a project, for example, embodied by the profile of the developer's team, their skills, and preferences and proficiency with selected technologies.

Software component in the present disclosure refers to software in the nature of a framework, library or tool employed toward the creation of software artifacts.

Developer profile in the present disclosure refers to a set of attributes that quantify the skills, skill-levels, proficiency and capability of a software developer.

Figure 1:
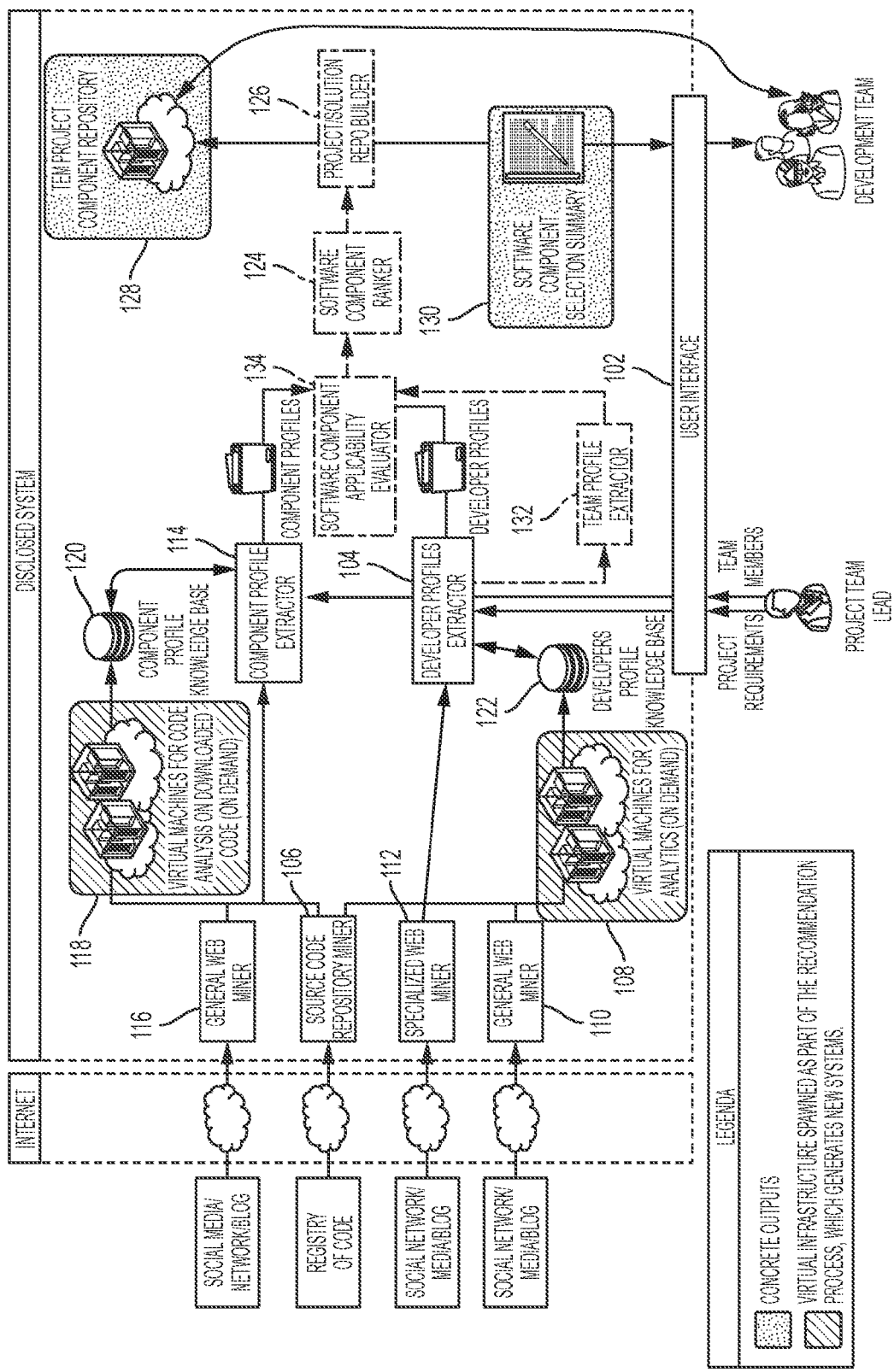
FIG. 1 is a diagram illustrating components of a system in one embodiment of the present disclosure.

FIG. 1 is a diagram illustrating components of a system in one embodiment of the present disclosure. The components shown execute on one or more computer or hardware processors. The system receives functional and non-functional requirements of project, which a user may input, for example, via a user interface 102.

A developer profile extractor component 104 in the system of the present disclosure in one embodiment extracts profiles of each developer in a given team. In one embodiment, developer profiles may be stored on a developer profile knowledge base 122 from which the developer profile extractor component 104 may extract developer profiles. The developer profile extractor component 104 may be responsible for mining the profile of a developer (e.g., skills, preferences, capabilities, and/or others) from various data sources. The developer profile extractor component 104 may take as input, identifying information about a developer (email address, blog handle, social network user identification or identifier (ID), and/or others). Optionally, a manually specified set of profile information may be received as input. The developer profile extractor component 104 may then infer a more complete profile of the developer, for example, employing the following sub-components.

Source code represents an output of a developer's work and can thus be used to infer the profile of a developer in terms of skills and proficiency. A source repository extractor or miner 106 may mine public and private source code repositories (e.g., GitHub, Gitlab, Sourceforge, TopCoder, and/or others) for software that a person has authored or collaborated-on, and infers:software components that a developer is familiar with (programming languages, libraries, frameworks, tools, and/or others); the proficiency, skill level and coding style of the developer. The developer profile extractor component 104, for example, using on demand virtual machines analytics 108, may infer both aspects by performing various analytics on the syntax and semantics of source code and associated meta-data (e.g., build files, commit history, repository meta-data, and/or others). In the first aspect, for instance, the software components that a developer has used may be analyzed from the dependencies of the project source code they authored (e.g., through the project's build files such as maven, sbt, node package file, through import and include statements in source code, and/or others). The extent to which a developer has used them may also be inferred, for example, by identifying the percentage of application programming interface (API) calls used by a developer relative to those offered by the software component. In the second aspect, determining skill level, style and proficiency, may be determined through various analytics on source code and comparing against established or mined patterns for the API usage of components, idiomatic language expression or using machine learning techniques where, for instance, a system is trained to identify various kinds of skill levels through a model on the authorship styles of known developers. Moreover, the progression of a developer's proficiency over time can be observed (through commits over time for a single project and across projects) and used to infer how fast a developer mastered the use of a software component.

Since it is often the case that the creation of software is a collaborative effort, analysis performed on specific portions of the software authored by a developer would have higher weight than the properties inferred about the software as a whole. For instance if a user contributed to an application development project, the source code of the user's specific commits may be analyzed and used as more strong indicators of the user's profile than properties inferred about the application development project as a whole, which may be the collaborative effort of 100 s of developers. The developer profile extractor component 104 also may account for, or use, the properties of the software as a whole as it offers an insight into the skill level of a user in terms of the complexity of software with which the user is familiar working.

General non-source extractors, also referred to as general web miner 110, mines data from generic sources such as social media, blogs, articles, and/or others, authored by a user. The developer profile extractor component 104, via the general web miner 110, may infer developer profile information also using the data mined by the general web miner 110 and may identify technology topics that a user is familiar with, software components that the user has used and the user's sentiments about them. Various NLP techniques may be used or implemented to this end, such as entity extraction, topic modeling, sentiment analysis, and/or others.

The developer profile extractor component 104, via one or more specialized non-source extractors 112, may extract and analyze data from a curated list of known sites that contain structured profile information about skills and capabilities. For instance, a profile of a person from a professional social network site may contain both the listing of technology skills a person is familiar with as well as endorsements a person has received from peers around each of those technologies. Other sources of similar information may include career websites, curriculum vitae (CV) of a person, and/or other web sites and/or sources. The specialized non-source extractor component 112 may be responsible for extracting a developer's profile from these information sources. The specialized non-source extractor component 112 may leverage the public web APIs of these services to fetch this information, and/or scrape data from these sources.

The developer profile that is generated according to the above-described process in one embodiment may include a tuple, <N,Q,A>, for each developer in the team, where:

N is the name or identifier of the developer.

Q is the confidence/quality of the profile. Q indicates whether overall the information retrieved from the search has contributed to build a good profile of the developer. For instance, there may be scarcity of information about the developer due to its sporadic activity, for example, not sufficient amount of information to build a good enough profile. This metric can be based on a qualitative scale (e.g., complete, good, sufficient, insufficient) or a quantitative scale (e.g., from 1 to N) and it is computed out of summarization of what has been found in the attributes.

A is a map of attributes that have been extracted from the profile extractor. For each attribute, which is a label in the map, there can be different values but a required attribute is again the overall quality that the profiler estimates for that specific attribute. Examples of attributes that can be extracted may include:

Languages: this may map to an array of known languages by the developer where it can be shown demonstrated proficiency. This information can be obtained and normalized, since the list of languages currently used today is limited and programmable languages have identifiable names (e.g., C, C++, JAVA,Perl,Go,Scala,Ruby, and/or others).

Roles: this attribute may be mapped a list of names that identify the specialization of the developer (e.g., front-end developer, full-stack developer, and/or others).

Technologies: this may be a list of the most used libraries, components, and tools used by the developer.

Experience/Skill Level: this information may be retrieved from by aggregating several bits of data from the number of commits to projects, rated posts in the technology community websites, roles undertook in several projects, bugs fixed, and/or others.

Other attributes may be added as additional metrics.

The tuples or developer profiles may be stored in a developer profile knowledge base 122 on one or more storage devices.

A team profile extractor component 132 infers team profile from developer profiles. This component may take as input a list of team members and build an overall team profile by aggregating individual developer profile of each member. Various aggregation methods may be employed to this end. This component may also compute a profile on team dynamics, for instance, quantify the team's disparity in skills and coding style, history of past collaboration, and/or others.

A software component extractor component 114 in the system of the present disclosure in one embodiment extracts profile of software components. In one embodiment, component profiles may be stored on a profile knowledge base 120 from which the software component extractor component 114 may extract component profiles. The software component extractor, also referred to as a component profile extractor 114, may be responsible for mining the profile of a software component (e.g., programming language, software component dependencies, popularity, developer community, and/or others) from various data sources, and may employ the following sub-components.

A source repository extractor or miner 106 may mine source code repositories (e.g., GitHub, Gitlab, Sourceforge, Issue trackers, and/or others). This component may retrieve contents about software components from public software repositories (e.g., both source code and meta-data) for analysis. One or more virtual machines 118 may perform analysis on downloaded code or content, for example, on demand. The types of analysis performed on source code may include, but not limited to: source code level analysis such as identification of the components dependencies, complexity, size; meta-data information such as popularity, activity, extracted from repository specific indicators (e.g., stars, forks, pull requests in GitHub), analysis of the community behind projects from this meta-data (e.g., identifying the skill level of contributors of the projects, quantifying the size and sentiment of the community of a software component).

Non-source extractor, also referred to as a general web miner 116, may extract data from sources such as blogs, forums, social media, and/or others, and implement or apply various NLP techniques such as topic modeling, sentiment analysis, and/or other, to identify profile information about a software component such as popularity over time, community support, sentiment.

In some embodiments, code analysis of the data extracted by the general web miner 116 and the source code repository miner 106 may be performed on one or more virtual machines 118 and stored in a component profile knowledge base 120.

The processing of the component profile extractor 114, for example, with its sub-components (e.g., 116, 106, 118) may generate a tuple that takes into account the characteristics of the software component. The tuple may be structured as follows:

<N,Q,A> where:

N is a name or identifier of the component.

Q is an estimation of the quality of the component as a synthetic measure generated from the analysis and the extractions of the attributes that have been inferred.

A is a map of attributes and information about the component that have the quality index of the component and used during the matching phase by a software component applicability evaluator.

Examples of attributes may include, but are not limited to:

Languages: this attribute maps to a collection of languages in which the component is available. This information may be extracted by inspecting the source code repository or the artifact repository where the component is made available.

Function: function attribute may be expressed as a collection of tags that identify the function or application space of the component.

Popularity: a measure for popularity is an aggregation of factors, e.g., the number of pull request of its source repository, the number of stars for it, the number of projects that use the component. Additional insights may be obtained by exploring the unstructured text and analyzing comments.

Maturity: this information may be extracted by looking at the version number of the component, the number of years it has actively maintained, and whether it has been used in large scale projects. Other attributes can be inferred.

A software component applicability evaluator component 134 computes distance between the profiles of team, software components and the requirements and constraints of projects. The computed distances are aggregated, and relevant software components are ranked based on aggregate distances. Relevant software component metadata, source and/or binary are downloaded based on ranked results and user selection.

Software component applicability evaluator, for example, may compute an estimate of the time and effort it would take a given team to adopt and use a given software component. This component may achieve this by computing a distance between the profiles of software component and that of the team within constraints and requirements of a specific project. Specifically the system may compute the following two distances: 1) familiarity distance and 2) proficiency estimator.

Familiarity distance: for components that a team is not familiar with, the software component applicability evaluator may compute an estimate of the learning curve associated with a component, for example, by combining a number of indicators. In one embodiment, combining the indicators may include using a linear combination (e.g., sum), in which each indicator is weighted by one or more attributes such as "confidence" and "user preference". The following shows examples of indicators.

Semantic distance between concepts describing the component and the team, using a domain specific ontology. In this ontology languages like JAVA and Scala may be closer than JAVA and Go, given both languages run on the JAVA virtual machine (JVM). This association and similarity between concepts may also be based on dynamic ontologies where associations are created based on analysis of real world corpus of text (e.g., websites, blogs, and/or others).

The degree of separation of components, inferred through a software component graph including components and developers as vertices and dependencies, usages and contributions as edges. In one embodiment, a shorter path between any two nodes in the graph indicates higher familiarity. This analysis determines how familiar the software component is to what the team already knows. The development profile extractor 104, for example, may build the graph.

The software component applicability evaluator may also use indicators from global source code analysis to infer how many developers similar to the current team's profiles have adopted the component (e.g., by analyzing their commit history for a project and across projects) and infer how long it took to master the components. These factors may be quantified and weighted into a distance that quantifies the estimated learning curve for a team. The value might not necessarily map to a unit of time, but may be used as an abstract value used for ranking components.

Proficiency Estimator: The complexity of a given software component may be inferred from the component's profile and a team's proficiency from the team's profile. Additionally information from global source code analysis on other teams with similar profiles adopting this source component may be factored in. The required level of proficiency to use the tool may be estimated based on these two factors.

The proficiency estimator may compute the degree of familiarity of the entire team and each individual to the components and compute the learning curve, which is a measure of how far departed a concept is from another. This may be learnt through a combination of ontology, for example, an ontology of programming languages received as input, and comparing or evaluating the degree of separation between components. The received ontology of programming languages specifies the relationship between procedural, object oriented, logic, functional language concepts. For instance, based on a component graph of all components, the proficiency estimator may evaluate how these components are connected across dependencies, topics/concepts of the projects, and technology similarity inferred from domain specific ontology.

Maturity level may be inferred by the current state of the component in a capability maturity model. For example, five levels provided by the model may be used, which identify the following states:

Initial (chaotic, ad hoc, individual heroics): the starting point for use of a new or undocumented repeat process.
Repeatable: the process is at least documented sufficiently such that repeating the same steps may be attempted.
Defined: the process is defined/confirmed as a standard business processes.
Managed: the process is quantitatively managed in accordance with agreed-upon metrics.
Optimizing: process management includes deliberate process optimization/improvement.

Stability is a way to measure a component's stability by analyzing commitments that over time affect the basic functionalities of the component itself. As time progresses and the component evolves, less subcomponents that are linked to the key goals of the software are added or modified.

Popularity is measured by the number of downloads over time and also by the adoption rate, given the nature of components, different packages may achieve the same goal, and over time have the facto become the standard package to achieve such tasks, similarly, new packages may have just recently appeared, therefore a measure that keeps track over time of the package utilization through current download clients and its usage in current projects is used.

In one embodiment, the proficiency estimator may use a linear combination of the factors to derive a score, which is used as input by the ranking function implemented by the software component ranker (124, FIG. 1). The proficiency estimator functionality may be performed by the software component ranker 124.

Software components ranker 124 ranks all components using the results of the software component applicability evaluator by aggregating the distances and scores generated.

In one embodiment, a linear combination may be used for aggregation, where each factor may be weighted by one or more attributes such as confidence level and user preference. In this embodiment, the weighted sum yields a score. Based on the rankings, the system of the present disclosure may automatically select software components, and also may automatically download or deploy the selected software components to a team's development system. These rankings also allow teams to select the most applicable component based on the team's profile, project requirements and constraints.

A project or solution builder 126 may build a tool comprising the selected software components. The tool that is built may be stored in a team project component repository 128. A software component selection summary 130 listing the software components recommended and/or downloaded may be presented to a user, for example, via the user interface 102.

As shown in FIG. 1, the system in one embodiment may include the following functionalities or components that execute on one or more computer or hardware processors: a user interface 102, a developer profile extractor 104, a component profile extractor 114, software component ranker 124, a project solution/repo builder 126. The system may also include a developers profile knowledge base 122 and a component profile knowledge base 120, stored on one or more storage devices and accessed by one or more computer or hardware processors.

A user of the system (e.g., the project manager) may enter, via the user interface 102, requirements for a project and list members that will be part of the team for the project, for example, project development. The developer profile extractor 104 uses the team details to build a profile of the developer. In some embodiments, this operation may be carried out by connecting to both the corporate and the external network to download information and software artifacts (e.g.: github repositories, authored by the user for further analysis) in relation to the developer. In the case of download of repositories the operation may include spawning a virtual machine (e.g., 108) on which to clone the repository and extract the information.

The component profile extractor 114 uses the project requirements to identify broadly relevant software components and analyzes these components to profile them. This operation in some embodiments involves downloading software metadata, binaries, original source code, and blog posts from technical and social networks. These tasks include instantiation (e.g., creation and execution) of virtual machines 118 to act as a repository for the downloaded material or execution environment, for example, for the following operations: a) code analysis (e.g., generating metrics); b) performance analysis (e.g., executing tests and monitoring execution time); c) text analytics on documentation and non-structured information analytics.

Based on those extracted profiles of the components and developers, the software component ranker 124 may compute the applicability of each software component listed or extracted by the component profile extractor 114, for the team profile evaluated in developer profile extractor 104. The output of the software component ranker represents an optimal software component selection for the development team associated with the project. This information may be then provided to the Project/Solution Repo Builder 126, which composes or generates a project team component repository 128, represented by a virtual instance containing all the downloaded components identified for the project. The Project/Solution Repo Builder 126 also may provide a software component selection summary 130 that is exposed to the development team via the system user interface 102. In one aspect, at the end of the process the team is not only presented with a the summary of the optimal selection of the components but also with a project repository that contains all the components being selected, ready for use.

Figure 2:
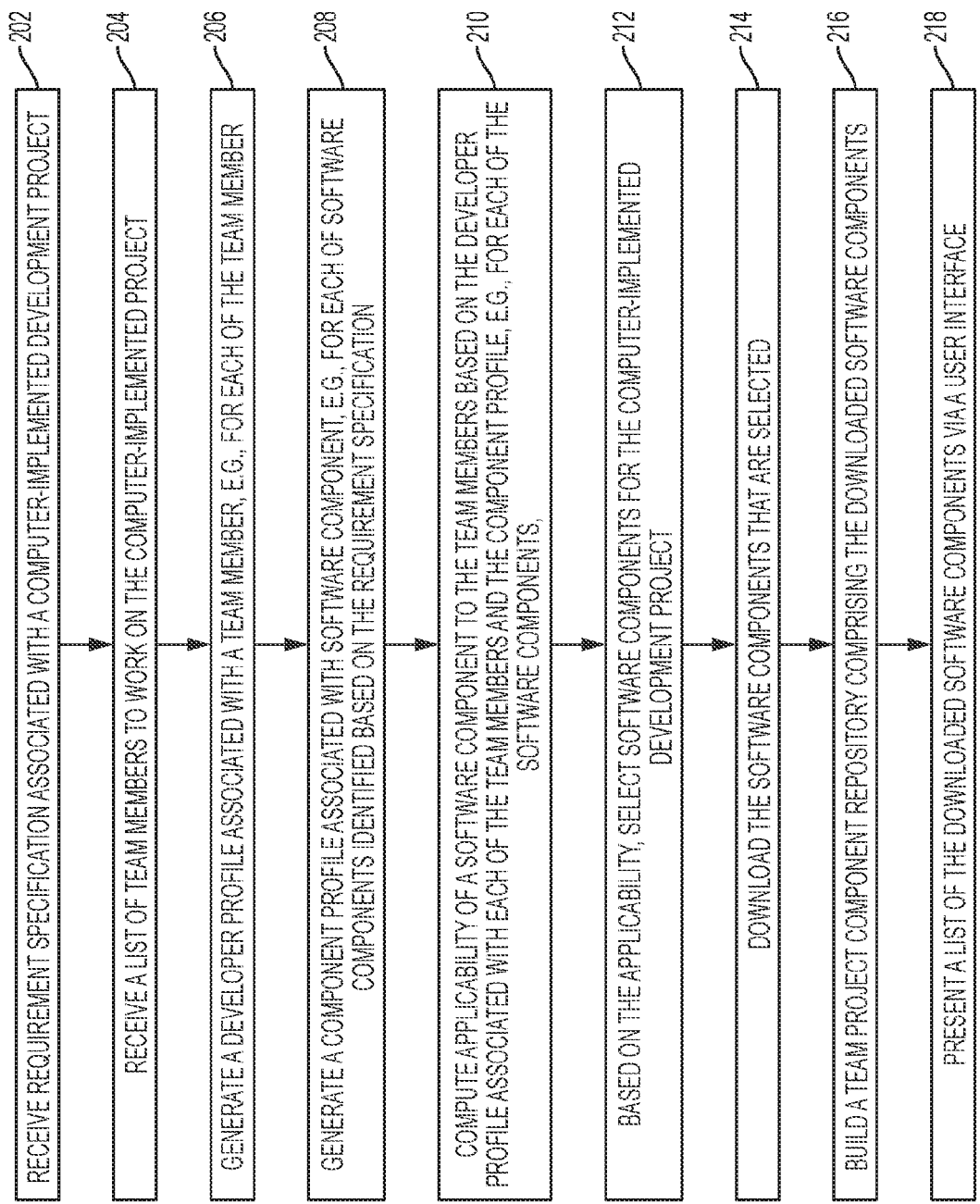
FIG. 2 is a diagram illustrating a method in one embodiment of the present disclosure.

FIG. 2 is a diagram illustrating a method in one embodiment of the present disclosure. The method may generate a contextualized software tool repository. The method may be performed by one or more hardware processors. At 202, requirement specification associated with a computer-implemented development project may be received, for example, via a user interface. At 204, a list of team members to work on the computer-implemented development project may be received, for example, via the user interface.

At 206, a developer profile associated with each of the team members may be generated. For instance, source code repositories may be mined or searched for software a team member has worked on. A virtual machine may be instantiated to execute on a processor and the virtual machine may analyze the software to determine programming language, computer-implemented code library, computer-implemented framework and tool the team member is familiar with, proficiency level and coding style of the team member. Other information may be extracted from mining and/or analyzing. In one embodiment, the proficiency level is determined by a machine learning model trained to identify skill levels based on authorship styles of known developers. In some embodiments, public web sites may be searched for mining source code repositories. Generating a developer profile may further include searching public web sites comprising social network site for artifacts associated with the team member, the virtual machine further analyzing the artifacts using a natural language processing technique and identifying technology topic the team member is familiar with. Other information may be extracted. In some embodiments, the developer profile may be stored as a data structure comprising a tuple comprising an identifier of a team member, confidence metric associated with the developer profile, and attributes associates with the team member, the attributes comprising computer language, role, technology and proficiency level. Other attributes may be stored in the data structure. In some embodiments, an overall team profile may be generated by aggregating the developer profile associated with each of the team members.

At 208, software components may be identified based on the requirement specification and a component profile associated with each of the software components may be generated. Identifying and generating a component profile may include mining source code repositories for source code and associated metadata, and instantiating a virtual machine to analyze the source code to determine component dependencies associated with the source code, popularity and activity associated with the source code, skill levels associated with contributors to the source code, size and sentiment associated with the source code from a community of developers. Other information associated with the software components may be extracted. Generating a component profile may further include searching public web sites comprising social network site, and the virtual machine further may perform analysis on content from the public web sites to determine popularity over time, community support, and sentiment associated with the source code. Other information associated with the source code may be extracted. In some embodiment, the component profile is stored as a data structure comprising a tuple comprising an identifier of a component, quality indicator associated with the compo-nent, and attributes associated with the component, the attributes comprising computer language in which the component is available, function associated with the component, popularity associated with the component and maturity associated with the component. Other attributes may be stored in the data structure.

At 210, applicability of a software component to the team members based on the developer profile associated with each of the team members and the component profile may be computed, for example, for each of the software components. For instance, a distance may be computed between the attributes associated with the team member specified in developer profile and the attributes associated with the component specified in the component profile, to determine the applicability. In one embodiment, the applicability may be computed by counting the length of a path in an ontology of programming concepts. One end of a path may be the concepts represented by the component (e.g., JAVA—an object oriented language), and the other end of the path may be the concept known by the developer (e.g., C++, another object oriented language).

At 212, based on the applicability, software components for the computer-implemented development project are selected. At 214, the software components that are selected are downloaded. At 216, a team project component repository is built based on the downloaded software components. For instance, the team project component repository comprises the downloaded software components, which are stored in a storage device. At 218, a list of the downloaded software components may be presented on the user interface.

Figure 3:
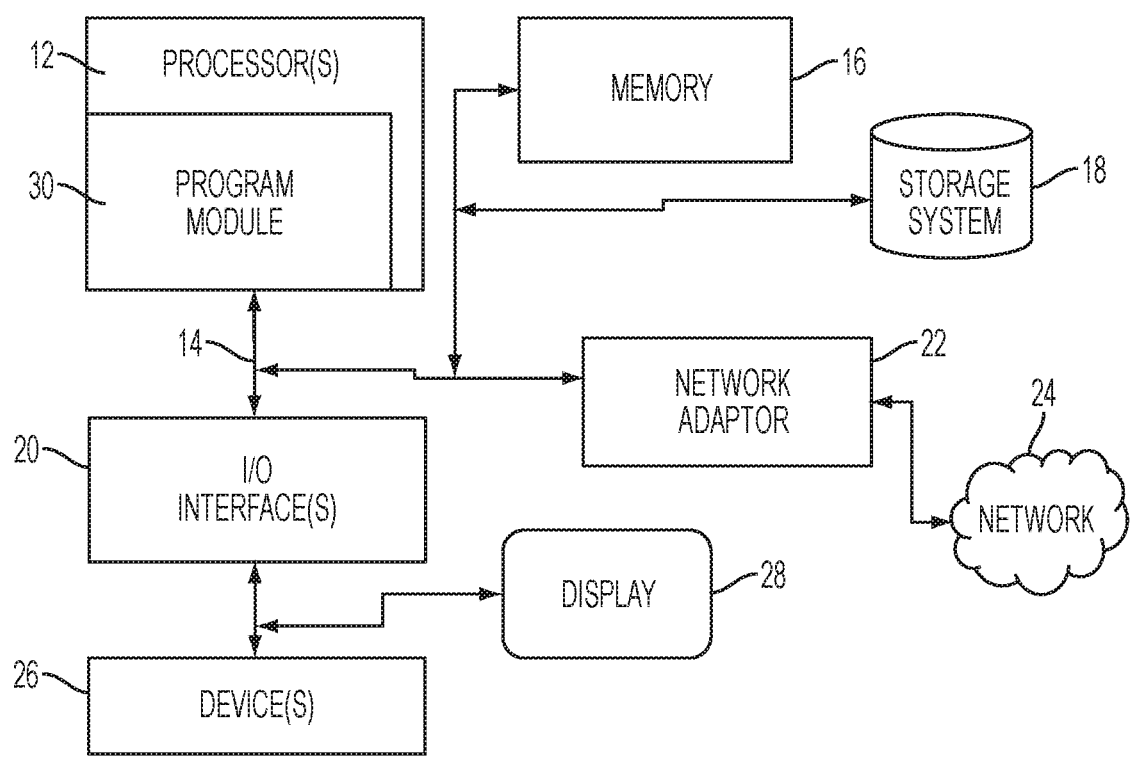
FIG. 3 illustrates a schematic of an example computer or processing system that may implement a contextualized component selection system in one embodiment of the present disclosure.

FIG. 3 illustrates a schematic of an example computer or processing system that may implement a contextualized component selection system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of generating a contextualized software tool repository, the method performed by at least one hardware processor, comprising:
   receiving, via a user interface, requirement specification associated with a computer-implemented development project;
   receiving, via the user interface, a list of team members to work on the computer-implemented development project;
   generating a developer profile associated with each of the team members;
   identifying software components based on the requirement specification associated with the computer-implemented development project by instantiating a virtual machine to act as an execution environment in at least performing code analysis of the software components and executing a test and monitoring execution time associated with the software components;
   generating a component profile associated with each of the software components;
   for each of the software components, computing applicability of a software component to the team members based on the developer profile associated with each of the team members and the component profile;
   based on the applicability, selecting software components for the computer-implemented development project;
   downloading the software components that are selected; and
   building a team project component repository comprising the downloaded software components.

2. The method of claim 1, further comprising:
   presenting a list of the downloaded software components on the user interface.

3. The method of claim 1, wherein the generating a developer profile comprises mining source code repositories for software a team member has worked on, instantiating a virtual machine and analyzing by the virtual machine the software to determine programming language, computer-implemented code library, computer-implemented framework and tool the team member is familiar with, proficiency level and coding style of the team member.

4. The method of claim 3, wherein the proficiency level is determined by a machine learning model trained to identify skill levels based on authorship styles of known developers.

5. The method of claim 3, wherein the mining source code repositories comprises searching public web sites.

6. The method of claim 3, wherein generating a developer profile further comprises searching public web sites comprising social network site for artifacts associated with the team member, the virtual machine further analyzing the artifacts using a natural language processing technique and identifying technology topic the team member is familiar with.

7. The method of claim 1, wherein the developer profile is stored as a data structure comprising a tuple comprising an identifier of a team member, confidence metric associated with the developer profile, and attributes associates with the team member, the attributes comprising computer language, role, technology and proficiency level.

8. The method of claim 1, further comprising generating an overall team profile aggregating the developer profile associated with each of the team members.

9. The method of claim 1, wherein the generating a component profile comprises mining source code repositories for source code and associated metadata, and instantiating a virtual machine to analyze the source code to determine component dependencies associated with the source code, popularity and activity associated with the source code, skill levels associated with contributors to the source code, size and sentiment associated with the source code from a community of developers.

10. The method of claim 9, wherein the generating a component profile further comprises searching public web sites comprising social network site, the virtual machine further performing analysis on content from the public web sites to determine popularity over time, community support, and sentiment associated with the source code.

11. The method of claim 1, wherein the component profile is stored as a data structure comprising a tuple comprising an identifier of a component, quality indicator associated with the component, and attributes associated with the component, the attributes comprising computer language in which the component is available, function associated with the component, popularity associated with the component and maturity associated with the component.

12. The method of claim 1, wherein the computing applicability of the software component to the team members comprises computing a distance between the attributes associated with the team member specified in developer profile and the attributes associated with the component specified in the component profile.

13. A computer readable storage medium storing a program of instructions executable by a machine to perform a method of generating a contextualized software tool repository, the method comprising:
    receiving, via a user interface, requirement specification associated with a computer-implemented development project;
    receiving, via the user interface, a list of team members to work on the computer-implemented development project;
    generating a developer profile associated with each of the team members;
    identifying software components based on the requirement specification associated with the computer-implemented development project by instantiating a virtual machine to act as an execution environment in at least performing code analysis of the software components and executing a test and monitoring execution time associated with the software components;
    generating a component profile associated with each of the software components;
    for each of the software components, computing applicability of a software component to the team members based on the developer profile associated with each of the team members and the component profile;
    based on the applicability, selecting software components for the computer-implemented development project;
    downloading the software components that are selected; and
    building a team project component repository comprising the downloaded software components.

14. The computer readable storage medium of claim 13, further comprising:
    presenting a list of the downloaded software components on the user interface.

15. The computer readable storage medium of claim 13, wherein the generating a developer profile comprises mining source code repositories for software a team member has worked on, instantiating a virtual machine and analyzing by the virtual machine the software to determine programming language, computer-implemented code library, computer-implemented framework and tool the team member is familiar with, proficiency level and coding style of the team member.

16. The computer readable storage medium of claim 13, wherein the generating a developer profile further comprises searching public web sites comprising social network site for artifacts associated with the team member, the virtual machine further analyzing the artifacts using a natural language processing technique and identifying technology topic the team member is familiar with.

17. The computer readable storage medium of claim 13, wherein the generating a component profile comprises mining source code repositories for source code and associated metadata, and instantiating a virtual machine to analyze the source code to determine component dependencies associated with the source code, popularity and activity associated with the source code, skill levels associated with contributors to the source code, size and sentiment associated with the source code from a community of developers.

18. The computer readable storage medium of claim 17, wherein the generating a component profile further comprises searching public web sites comprising social network site, the virtual machine further performing analysis on content from the public web sites to determine popularity over time, community support, and sentiment associated with the source code.

19. A system of generating a contextualized software tool repository, comprising:
    at least one hardware processor; and
    a storage device coupled to the hardware processor;
    the hardware processor operable to receive, via a user interface, requirement specification associated with a computer-implemented development project;
    the hardware processor further operable to receive, via the user interface, a list of team members to work on the computer-implemented development project;
    the hardware processor further operable to generate a developer profile associated with each of the team members;
    the hardware processor further operable to identify software components based on the requirement specification associated with the computer-implemented development project by instantiating a virtual machine to act as an execution environment in at least performing code analysis of the software components and executing a test and monitoring execution time associated with the software components;
    the hardware processor further operable to generate a component profile associated with each of the software components;
    for each of the software components, the hardware processor further operable to compute applicability of a software component to the team members based on the developer profile associated with each of the team members and the component profile;
    based on the applicability, the hardware processor further operable to select software components for the computer-implemented development project;

the hardware processor further operable to download the software components that are selected;

the hardware processor further operable to build a team project component repository comprising on the downloaded software components and store in the storage device.

20. The system of claim 19, wherein the hardware processor is further operable to present a list of the downloaded software components on the user interface.

\* \* \* \* \*